United States Patent [19]

Simoens

[11] Patent Number: 4,817,821

[45] Date of Patent: Apr. 4, 1989

[54] VALVE FOR PRESSURIZING A COMPRESSED GAS ACCUMULATOR AND FOR THE SUDDEN DISCHARGE OF GAS FROM THE ACCUMULATOR

[76] Inventor: Hervé H. J. Simoens, 40 Avenue Foch, 59700 Marco en Baroeul, France

[21] Appl. No.: 204,943

[22] Filed: Jun. 6, 1988

Related U.S. Application Data

[63] Continuation of Ser. No. 919,383, Oct. 16, 1986, abandoned.

[30] Foreign Application Priority Data

Oct. 31, 1985 [FR] France .................................. 85 16619

[51] Int. Cl.⁴ ............................................. B65D 88/70
[52] U.S. Cl. ......................................... 222/3; 222/195
[58] Field of Search ..................... 222/3, 195; 406/85, 406/136, 137; 124/55; 137/102, 107; 251/63

[56] References Cited

U.S. PATENT DOCUMENTS

| 3,788,527 | 1/1974 | Matson | 222/195 |
| 3,915,339 | 10/1975 | Matson | 222/3 |
| 4,051,982 | 10/1977 | Stetson | 222/3 X |
| 4,496,076 | 1/1985 | Tompkins | 222/195 X |
| 4,579,138 | 4/1986 | Simoens | 137/102 |

FOREIGN PATENT DOCUMENTS

| 0021999 | 1/1981 | European Pat. Off. | 222/195 |
| 2727542 | 1/1979 | Fed. Rep. of Germany | 222/195 |
| 1089005 | 4/1984 | U.S.S.R. | 222/195 |

Primary Examiner—Kevin P. Shaver
Attorney, Agent, or Firm—Kerkam, Stowell, Kondracki & Clarke

[57] ABSTRACT

A feed valve for the quick discharge of an accumulator includes a piston with a small clearance relative to a cylinder. The piston has a rear face carrying a guide block which maintains the piston in proper position by cooperation with a slide. An elastic device, such as a spring, biases the piston to a closed position. The valve arrangement is especially useful for silo products such as granular or pulverulent products.

21 Claims, 1 Drawing Sheet

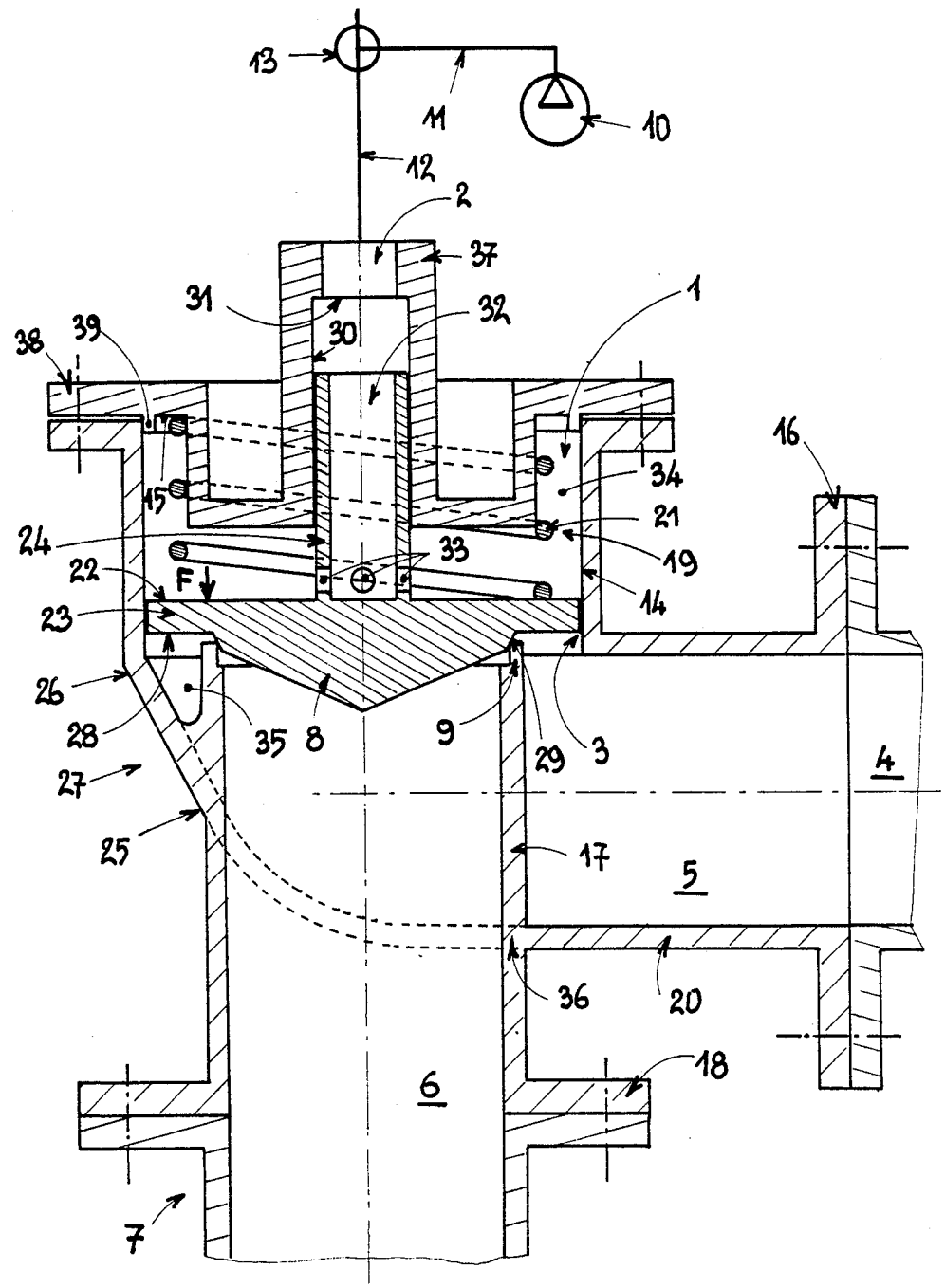

VALVE FOR PRESSURIZING A COMPRESSED GAS ACCUMULATOR AND FOR THE SUDDEN DISCHARGE OF GAS FROM THE ACCUMULATOR

This is a continuation of application Ser. No. 919,383, filed Oct. 16, 1986, now abandoned.

The invention concerns a valve for supplying gas under pressure to a tank-like compressed gas accumulator and the subsequent sudden discharge of gas from the accumulator.

In particular, but not exculsively so, the invention can be effectively applied to improve the flow of a granular or pulverulent product at the outlets of installations such as silos and hoppers.

It also ensures this flow improvement by eliminating stagnant packets in dead zones and/or by destroying both the layer adhering to the walls and the bridge or arch formed by the product in front of the outlet. Such a sudden discharge value, sometimes called an air gun, comprises firstly a feed chamber provided with a filler neck and an opening for communicating with the compressed gas accumulator and, secondly, a discharge passage leading towards the installation, the sudden discharge valve being applied in this direction. The feed chamber consists at the rear of a cylinder housing a free translation piston undergoing, in one direction, a thrust due to the action of a pressure and in particular to that of the gas introduced into the feed chamber in order to fill up the compressed gas accumulator.

In order to control circulation of the gas inside the discharge passage, the latter is split up into two sections by means of a sheet which cooperates with a blockage and control unit which is borne directly by the piston set in place by the pressure propelling the piston.

As soon as the corresponding pressure in the feed chamber is released, the pressure of the gas present in the compressed gas accumulator acts on the piston in a direction opposite that of the thrust cited above and, with a sharp blow, causes the piston to return, the latter then forcefully opening the outlet sleeve of the compressed gas accumulator until the reappearance of the feed pressure in order to refill the compressed gas accumulator.

The piston is sufficiently long, especially at its diameter, to ensure that it is guided into the cylinder as accurately as possible and to thus avoid any possible jamming inside the said cylinder in which it is in practice without clearance so as to establish, between the feed chamber and the front of the piston, the imperviousness needed to guarantee the return of the stop valve to its seat.

With the aim of releasing the feed pressure, the filler neck is generally connected to the gas source under pressure by means of a distributor with several channels enabling in particular this neck to be closed or connected at will to the pressure source or the open air.

Apart from being complex and therefore very expensive, the first valves of this type to appear on the market for example as disclosed in Stetson U.S. Pat. No. 3,942,684 exhibited drawbacks, firstly as regards the considerable spatial requirement of the valve and considerable inertia of the piston and secondly, the load loss sustained by the gas when, for discharge, it needed to traverse a relatively small sectional passage to the right of the stop valve seat.

The gas then took more time to flow and this therefore considerably reduced the suddenness of the discharge.

More recently, so as to avoid a load loss, a new sudden discharge valve (FR-A-No. 2.429.952) appeared retaining an almost constant sectional discharge passage through the seat.

In this valve, the length of the cylinder is at least equal to double the discharge passage, one of whose sections is connected to the front of the cylinder, the other section being inserted radially towards the front of the cylinder so that its outlet connecting it to the cylinder is blocked by the piston when the latter is in front of it, but is largely open when the piston is behind it.

The cylinder connection outlet then directly produces the seat of the stop valve formed by the lateral surface of the piston.

For its guidance, as mentioned above, but also so as to form the stop valve of this seat, the piston always needed to have a length greater than the diameter of this discharge mouth, which also resulted in a piston and cylinder which were too long and therefore too heavy, the piston thereby having too much inertia and a control which required a large passage provoking violent limit of travel shocks but also, both as regards the piston and cylinder, a high material cost of large spatial requirement.

So as to limit damage due to the piston limit of travel impacts, at least one of the piston extremities is provided with a relatively flexible stop which, however, rapidly deteriorates and is not resistant when valves are used in installations working at high temperatures as, for example, in the case of cement works.

To overcome these drawbacks, a process now exists (EP No. 0134726) using firstly a piston whose length is much smaller than its diameter and secondly a cylinder penetrated at one extremity by a connection piece which forms the second section of the discharge passage and whose other extremity forms the seat of the stop valve borne by the front side of the piston. At least one of the parts formed by this connection piece extremity and that part of the piston not covered by the seat of the stop valve also delimits, together with the cylinder, an annular passage which communicates directly with the first section of the discharge passage but which is separated from the admission chamber by the piston which is engaged with clearance inside the cylinder so as to at least reserve for the gas an adequate passage from the admission chamber to the annular passage and the compressed gas accumulator, whilst the pressure of the gas admitted and exerted on the rear side of the piston keeps the stop valve of the latter supported on its seat.

This disposition gives goods results in that it results in a valve with a low spatial requirement and a piston with low inertia, but it also has limitations due to the fact that the length of the piston is too small in relation to its diameter so that it is automatically controlled by its peripheral wall.

To prevent it from jamming, it is mounted with a wide clearance. Furthermore, even if despite the extremely low inertia of the piston a low gas pressure inside the chamber is sufficient as regards its control, it is nevertheless necessary that this feed pressure be spontaneously reestablished following the sudden discharge of the accumulator so that the discharge passage can be closed without delay.

Owing to this large clearance and closing problems, it is only possible to impede the pulverulent produce which is suspended in the air on account of the discharge returning inside the admission chamber and disturbing the working of the valve.

In addition, including during the stopping of production, in order to avoid a reopening of the stop valve, it is necessary to continuously maintain the feed pressure, not only by means of an electrovalve, but also by producing gas under pressure in the event of a failure on the part of the electrovalve.

SUMMARY OF THE INVENTION

One result the invention seeks to obtain is a valve of the type described above perfected so as to prevent the pulverulent product returning to the admission chamber.

Another result of the invention is a valve whose closing, together with the closure of the discharge circuit being maintained, is not dependent upon the return of the feed pressure.

A further result of the invention is a valve whose piston has its parallel translation accuately guided to the cylinder without the risk of jamming. To this effect, the invention seeks to provide a valve of the type mentioned above characterized in that, in combination, the piston:

is, via that part of it which separates the annular passage from the admission chamber, engaged inside the cylinder with a very small clearance, at the most roughly sufficient to provide the gas with a laminar passage from the admission chamber as far as the annular pipe, carries on its rear side a guide block whose axis is parallel to the axis of the cylinder, has a small cross section and cooperates with a sectional slide in addition to that of the guide block and produced to this effect by the bottom of the cylinder in which, when the stop valve of the piston rests on its seat, the guide block slides and is engaged over a length which, in relation to its largest transversal dimension, is still sufficient to guarantee perfect guidance of the guide block and thus the piston which bears it, receives on its rear side the thrust of an elastic device interposed between the bottom of the cylinder and the rear side of the piston.

The invention will be more clearly understood from the description which follows given by way of example by no means restrictive and the annexed drawing which diagrammatically represents a valve provided with a piston according to the invention.

BRIEF DESCRIPTION OF THE DRAWING

By referring to the drawing, it can be observed that the valve includes a feed chamber 1 provided with a filler neck 2 and a passage 3 directed towards a compressed gas accumulator.

split into two sections 5 and 6, a discharge of the accumulator 4 leading towards an installation 7 where the valve is applied. The feed chamber 1 is delimited at the rear of a cylinder 14 by a piston 8 which is subjected, in the direction indicated by the arrow F, to a thrust due to the action of the pressure of the gas introduced into the chamber 1 in order to fill the accumulator 4.

In order to control circulation of the gas in the discharge passage 5, 6, the latter passes through a seat 9 cooperating with a stop valve 29 borne directly by the front face 28 of the piston 8.

The first section 5 of the discharge passage extends from the accumulator 4 to the seat 9, whereas the second section 6 of this discharge passage extends from the seat 9 to the installation 7 and forms the actual outlet sleeve.

It is an advantage for the length of the piston 8 to be considerably less than the piston diameter and to be roughly in the form of a plate 23. A tube 17, which forms the second section 6 of the discharge passage, penetrates the cylinder 14 at one of its extremities.

The extremity of this tube 17 forms the seat 9 of the stop valve 29 borne by the front side 28 of the piston 8.

At least one of the parts forming this extremity of the tube or connection piece 17 and that part of the piston not covered by the seat of the stop valve also delimit, together with the cylinder 14, an annular passage 35 which communicates directly with the first section 5 of the discharge passage, itself connected to the accumulator 4 to be filled, by which is separated from the admission chamber 1 by the piston 8. The piston 8 is engaged with clearance inside the cylinder 14 so as to at least reserve for the gas the required passage 3 from the admission chamber 1 to the annular passage 35 and the accumulator 4.

The pressure of the gas admitted and being exerted on the rear side 22 of the piston keeps the stop vlave 29 of the latter in place on its seat 9.

So that the placing of the stop valve 29 is not directly and solely dependent upon the feed pressure, the piston 8 is constantly stressed towards the seat 9 by at least one elastic device 19 of any recognized type, but one whose rigidity is compatible with the stresses inherent in the gases used, in other words in such a way as to maintain valve functioning. In a preferred mode of embodiment, the elastic device is a compression spring 21 resting roughly on the bottom 15 of the cylinder 14 so as to expand against the rear side 22 of the piston.

As soon as the feed pressure in the chamber 1 is released, the pressure of the gas present in the accumulator 4 also acts but in the direction opposed to the arrow F on that part of the piston 8 which covers the annular passage 35.

This pressure then causes the piston to abruptly return to the bottom 15 of the cylinder opposing the action of the elastic device 19. The stop valve 29 of this piston 8 thus abruptly comes away from the seat and duly opens the outlet sleeve 6.

Conventionally and with the aim of releasing the said feed pressure, the filler neck 2 is connected to a source 10 of the gas under pressure via a pipe in two sections 11 and 12 passing through a three-way valve 13 enabling this neck 2 to be closed or connected both at the source 10 and in the open air.

In a preferred mode of embodiment, in order to obtain a rapid pressure drop inside the feed chamber, the three-way valve is itself made up of a valve of the type forming the subject of the present invention.

The first section 5 of the discharge passage is formed by a pipe 20 connected laterally to the body 36 of the valve and in particular connected to the annular passage 35 encompassing the connection piece 17 forming the second section 6 of the passage.

At their opposite extremity, the pipe 20 and connection piece 17 each respectively carry a flange 16, 18 forming a connection with the accumulator 4 and with the installation 7.

It is an advantage for the cross section of the annular passage 35 to equal the size of the internal section of the pipe and the connection piece 17.

This section also equals the lateral surface area of a dummy cylinder extending the connection piece as far as the piston in the pushed back position.

The bottom of the annular passage 35 is knowingly formed by a truncated part 27 whose large base 26 is connected to the cylinder 14 and whose small base 25 is connected to the periphery of the connection piece 17, the taper or conicity of which is such that it ensures constancy of the section of the connection between the pipe 20 and the annular passage 35.

By observing these section equalities, it is possible to ensure there is no load loss.

According to one essential characteristic of the invention, in combination the piston 8:

is, via that part of it which separates the annular passage 35 from the admission chamber 1, engaged inside the cylinder 14 with a very small clearance which at the maximum is just sufficient to provide a laminar passage 3 with the gas from the admission chamber 1 as far as the annular passage 35, carries on its rear side 22 a guide block whose axis is parallel to the axis of the cylinder 14, having a small cross section and cooperating with a sectional slide additional to that of the guide block 24 and produced to this effect by the bottom 15 of the cylinder 14 in which, when the stop valve 29 of the piston rests upon its seat 9, the guide block 24 slides and is engaged over a length which, in relation to its largest transversal dimension, is still sufficient to guarantee accurate guiding of the guide block 24 and thus the piston which carries it, receives on its rear face 22 the thrust of an elastic device 19 interposed between the bottom 15 of the cylinder 14 and the rear face 22 of the piston 8.

In a preferred mode, the guide block 24 is cylindrical rod centered on the axis of the piston and the slide is a bore sunk into a hub 37 of a rear closing over 38 of the cylinder 14.

The cover 38 itself obviously comprises a centering device 39 in the cylinder 14.

The length of the guide block control is preferably equal to at least the diameter of this guide block.

Thanks to this control, the clearance of the piston inside the cylinder can be significantly reduced to, for example, a tenth of a millimeter at the radius, which is sufficient to allow for the laminar passage of the gas but is then insufficient to allow for the passage of the pulverulent product.

In accordance with the invention:

firstly, the filler neck 2 is reserved in the bottom 31 of the slide 30 and, secondly, the guide block 24 comprises at least one totally axial channel 32 which, by means of at least one outlet 33, communicates with the feed chamber.

The outlets 33 are preferably situated so that when in the pushed back position, they are hidden by the slide which means that when the gas under pressure is admitted, it can only reach the chamber after having overcome the inertia of the piston.

For example, the outlets 33 laterally join the said rod roughly at the rear face 22 of the piston.

The guide rod 24 is preferably equipped with several evenly distributed outlets 33 on its base.

It is to be noted that when the seat 9 is opened to discharge the accumulator 4, the piston 9 comes, via its rear face 22, to a stop approximately against the bottom 15 of the cylinder 14 and the outlets 33 at the base of the guide rod 24 are hidden by the wall of the bore into which the said rod is engaged.

Thus, when the accumulator 4 is discharged, any loss of gas towards the feed circuit is avoided.

Of course during this phase, the elastic device 19, such as the spring 21, is compressed. In order to avoid the spring coils from becoming contiguous (i.e., overlapping), the coils are in contact opposite each other between the faces opposite the piston 8 and the cylinder 14 and the bottom 15 which is formed by the inner face of the hub 37 the inner face of the hub 37 forms a projection which delimits an annular seat of sufficient dimensions to enable the spring to be maintained and its coils to be housed, at least during the spring compression phase.

In the spring-back phase, this annular space 34 continues to ensure that the spring is kept in the correct position inside the cylinder 14.

The expert is able to determine the most suitable forms for the stop valve 29 of the piston 8 and for the seat 9 and accordingly, they are not described in detail here.

The piston 8 and its guide rod 24 shall preferably consist of a single piece made of a light material, such as aluminium.

I claim:

1. A quick release air device including a valve, a compressed gas accumulator (4) and an outlet conduit (6), said valve comprising: a piston having a length considerably smaller that its diameter;

a guide block having an axial length parallel to an axis of symmetry of said piston and having a small cross section relative to said diameter, said guide block being fixed to said piston;

a feed chamber in which said piston is disposed, said feed chamber having flow path between the accumulator and the outlet conduit when said piston is in an open position, said flow path being blocked when said piston is in a closed position;

a cylinder defining said feed chamber and having an end, said end serving as a seat on which the piston rests when disposed in said closed position, a portion of said piston extending beyond said seat and over a passage which communicates with said accumulator whereby said portion is subject to pressure from the accumulator when the piston is in its closed position;

an elastic means biasing said piston towards its closed position, saiid elastic means directly contacting a face of said piston, and said elastic means is disposed around said guide block; and a slide which cooperates with said guide block and in which said guide block slides to maintain said piston in proper alignment with the cylinder defining said feed chamber, said slide being at least partially surrounded by said elastic means, and wherein said feed chamber has a filler neck for supplying pressurized gas to said feed chamber.

2. The valve of claim 1 wherein the guide block (24) comprises at least one channel (32) having at least one outlet (33), which communicates with the feed chamber (1), said channel extending parallel to said axis of said cylinder.

3. The valve of claim 2 wherein said at least one outlet is situated so that when said piston is spaced from said seat, said at least one outlet is covered by the slide, such that when gas under pressure is admitted to said channel (32), the gas can only reach the chamber after said elastic means moves the piston towards its closed position.

4. A quick release air device including a valve, a compressed gas accumulator (4) and an outlet conduit (6), said valve comprising:

a cyclinder (14) defining a feed chamber (1) and having at a front end, a piston (8) which delimits said front end, the other end of said feed chamber being provided with a filler neck (2) for introducing and releasing pressurized gas to and from said feed chamber respectively, a passage (3) at the front end communicating with the accumulator (4), the front end of the cylinder being connected to a discharge passage (5) of the accumulator (4) for gas to pass from the accumulator (4) to the outlet conduit (6), the gas coming from the accumulator (4) passing by a seat (9) at the front end of the feed chamber (1), the seat (9) cooperating with a bearing surface (29) of the piston (8) which, when in contact therewith, serves as a stop valve, said piston (8) being kept in position against said seat (9) by gas pressure introduced into the feed chamber from said filler neck (2) and which acts on a rear face (22) of the piston in opposition to the action of gas pressure of the gas present in the accumulator (4), the gas present in the accumulator (4) acting on a front face (28) of said piston (8) which is not blocked by the seat (9), whereby upon releasing gas pressure from the feed chamber through said filler neck (2), a pressure drop inside the feed chamber occurs and gas within the accumulator (4) abruptly pushes the piston (8) away from the seat (9) and empties the pressurized gas from the accumulator (4) into the outlet conduit (6);

said piston (8) having a length smaller than its diameter;

said front end of said cylinder (14) having a connection piece (17) which defines portions of the discharge passage (15) and the outlet conduit (6), an extremity of said connection piece comprising the seat (9) for the bearing surface (29) of the piston (8);

at least one portion of said connection piece (17) at its extremity and said front face (28) of said piston (8) not blocked by the seat (9) defining, together with a portion of said cylinder (14), an annular passage (35) which communicates directly with the discharge passage (5) of the accumulator (4) but which is separated from the feed chamber (1) by the piston (8), said piston having a clearance with the inside of the cylinder (14) so as to define said passage (3) which communicates with the feed chamber (1), the annular passage (35) and the accumulator (4) even when the gas pressure is exerted on the rear face (22) of the piston (8) to keep the piston (8) on seat (9);

said piston (8) having on its rear face (22), a guide block (24) having an axis parallel to the axis of the cylinder (14), said guide block having a small cross section relative to the largest transversal dimension of said piston and cooperating with a slide in a cover (38) of the cylinder (14), wherein upon movement of the piston (8) the guide block (24) slides and is engaged with said slide over a length which is larger than the largest transversal dimension of the guide block to prevent misalignment of the guide block (24) and the piston (8) within said cylinder; and said piston (8) receiving on its rear face (22), the thrust of an elastic device (19) extending between the cover (38) and the rear face of the piston (8).

5. The device according to claim 4, wherein said elastic device is a coil spring having coils and an inner face of a hub (37) of said cover (38) forms a projection which delimits an annular space (34), said annular space (34) being of sufficient size to hold said coil spring without its coils overlapping when the coil spring is compressed.

6. The device according to claim 4, wherein:
the filler neck (2) is in the bottom (13) of the slide (30), and
the guide block (24) comprises at least one channel (32) having at least one outlet (33) which communicates with the feed chamber (1), said channel extending parallel to said axis of said cylinder.

7. The device according to claim 6, wherein said elastic device is a coil spring having coils and an inner face of a hub (37) of said cover (38) forms a projection which delimits an annular space (34), said annular space (34) being of sufficient size to hold said coil spring without its coils overlapping when the coil spring is compressed.

8. The device according to claim 6, wherein said at least one outlet is situated so that when said piston is spaced from said seat, said outlet is covered by the slide such that when gas under pressure is admitted to said channel (32), the gas can only reach the chamber after said elastic device moves the piston toward the seat.

9. The device according to claim 8, wherein said elastic device is a coil spring having coils and an inner face of a hub (37) of said cover (38) forms a projection which delimits an annular space (34), said annular space (34) being of sufficient size to hold coil spring without its coils overlapping when the coil spring is compressed.

10. The device according to claim 4, wherein the guide block (24) is a cylindrical pipe centered on the axis of the piston and disposed to slide in a bore of the slide.

11. The device according to claim 10, wherein said elastic device is a coil spring having coils and an inner face of a hub (37) of said cover (38) forms a projection which delimits an annular space (34), said annular space (34) being of sufficient size to hold said coil spring without its coils overlapping when the coil spring is compressed.

12. The device according to claim 10, wherein:
the filler neck (2) is in the bottom (31) of the slide (30), and
the guide block (24) comprises at least one channel (32) having at least one outlet (33) which communicates with the feed chamber (1), said channel extending parallel to said axis of said cylinder.

13. The device according to claim 12, wherein said elastic device is a coil spring having coils and an inner face of a hub (37) of said cover (38) forms a projection which delimits an annular space (34), said annular space (34) being of sufficient size to hold said coil spring without its coils overlapping when the coil spring is compressed.

14. The device according to claim 12, wherein said at least one outlet is situated so that when said piston is spaced from said seat, said outlet is covered by the slide, such that when gas under pressure is admitted to said channel (32), the gas can only reach the chamber after said elastic device moves the piston towards the seat.

15. The device according to claim 14, wherein said elastic device is a coil spring having coils and an inner face of a hub (37) of said cover (38) forms a projection which delimits an annular space (34), said annular space (34) being of sufficient size to hold said coil spring without its coils overlapping when the coil is compressed.

16. The device according to claim 10, wherein said slide is defined by a hub (37) of said cover (38) of the cylinder (14), and the cover (38) having thereon, means for centering the cover on the cylinder (14).

17. The device according to claim 16, wherein said elastic device is a coil spring having coils and an inner face of the hub (37) forms a projection which delimits an annular space (34), said annular space (34) being of sufficient size to hold said coil spring without its coils overlapping when the coil spring is compressed.

18. The device according to claim 16, wherein:
the filler neck (2) is in the bottom (31) of the slide (30), and
and guide block (24) comprises at least one channel (32) having at least one outlet (33) which communicates with the feed chamber (1), said channel extending parallel to said axis of cylinder.

19. The device according to claim 18, wherein said elastic device is a coil spring having coils and an inner face of said hub (37) of said cover (38) forms a projection which delimits an annular space (34), said annular space (34) being of sufficient size to hold said coil spring without its coils overlapping when the coil spring is compressed.

20. The device according to claim 18, wherein said at least one outlet is situated so that when said piston is spaced from said seat, said outlet is covered by the slide, such that when gas under pressure is admitted to said channel (32), the gas can only reach the chamber after said elastic device moves inertia of the piston towards the seat.

21. The device according to claim 20, wherein said elastic device is a coil spring having coils and an inner face of said hub (37) of said cover (38) forms a projection which delimits an annular space (34), said annular space (34) being of sufficient size to hold said coil spring without its coils overlapping when the coil spring is compressed.

* * * * *

UNITED STATES PATENT AND TRADEMARK OFFICE
CERTIFICATE OF CORRECTION

PATENT NO. : 4,817,821
DATED : April 4, 1989
INVENTOR(S) : SIMOENS, Herve' Hubert Jean It is certified that error appears in the above-identified patent and that said Letters Patent is hereby corrected as shown below:

Column 6, line 37, after "having" insert -- a --;

Column 6, line 50, change "saiid" to -- said --;

Column 6, line 55, change "with" to -- within --;

Column 7, line 29, after "whereby" insert ",";

Column 7, line 40, change "(15)" to -- (5) --;

Column 8, line 12, change "(13)" to -- (31) --;

Column 8, line 35, after "hold" insert -- said --;

Column 9, line 23, change "and" to --the --;

Column 9, line 6, after "coil" insert -- spring --;

Column 10, line 15, delete "inertia of"

Signed and Sealed this

Second Day of January, 1990

Attest:

JEFFREY M. SAMUELS

*Attesting Officer*    *Acting Commissioner of Patents and Trademarks*